(12) United States Patent
Niesen et al.

(10) Patent No.: US 10,555,131 B2
(45) Date of Patent: Feb. 4, 2020

(54) CARRIER-PHASE POSITIONING IN CELLULAR NETWORKS

(71) Applicant: QUALCOMM Incorporated, San Diego, CA (US)

(72) Inventors: Urs Niesen, Berkeley Heights, NJ (US); Junyi Li, Chester, NJ (US); Jubin Jose, Belle Mead, NJ (US); Libin Jiang, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/417,465

(22) Filed: May 20, 2019

(65) Prior Publication Data
US 2019/0373416 A1   Dec. 5, 2019

Related U.S. Application Data

(60) Provisional application No. 62/679,011, filed on May 31, 2018.

(51) Int. Cl.
 *H04W 4/029* (2018.01)
 *H04W 24/08* (2009.01)

(52) U.S. Cl.
 CPC ........... *H04W 4/029* (2018.02); *H04W 24/08* (2013.01)

(58) Field of Classification Search
 CPC ............................. H04W 4/029; H04W 24/08
 USPC .................... 455/456.1, 418, 422.1, 423, 421
 See application file for complete search history.

(56) References Cited

U.S. PATENT DOCUMENTS

| | | | | |
|---|---|---|---|---|
| 2008/0267142 | A1* | 10/2008 | Mushkin | H01Q 1/2291 370/338 |
| 2016/0352361 | A1* | 12/2016 | Fonseka | H03M 13/2906 |
| 2018/0268176 | A1* | 9/2018 | Sadr | H03M 13/2957 |

FOREIGN PATENT DOCUMENTS

| | | |
|---|---|---|
| WO | 2012161923 A1 | 11/2012 |
| WO | 2015060741 A1 | 4/2015 |

OTHER PUBLICATIONS

Exel R., "Carrier-Based Ranging in IEEE 802.11 Wireless Local Area Networks", 2013 IEEE Wireless Communications and Networking Conference (WCNC), Apr. 1, 2013 (Apr. 1, 2013), pp. 1073-1078, XP055615394, DOI: 10.1109/WCNC.2013.6554713 ISBN: 978-1-4673-5937-5, p. 1074, Paragraph III-p. 1078, Paragraph VI, Figures 1-7, Abstract.
International Search Report and Written Opinion—PCT/US2019/033339—ISA/EPO—Sep. 4, 2019.

* cited by examiner

*Primary Examiner* — Nghi H Ly
(74) *Attorney, Agent, or Firm* — Thien T. Nguyen

(57) ABSTRACT

A method for position determination based on carrier-phase measurements is disclosed. The method comprises receiving one or more downlink signals transmitted from a base station (BS) during a downlink period, wherein the downlink signals are modulated using a downlink carrier wave, measuring, during the downlink period, a first carrier phase associated with the downlink carrier wave, estimating, during an uplink period subsequent to the downlink period, an integer ambiguity (IA) change, and measuring, during a later downlink period subsequent to the uplink period, a second carrier phase based on the resolved first carrier phase and the estimated IA change.

30 Claims, 8 Drawing Sheets

CARRIER-PHASE POSITIONING IN CELLULAR NETWORKS

CROSS-REFERENCE TO RELATED APPLICATION

The present Application for Patent claims priority to U.S. Provisional Patent Application No. 62/679,011, entitled "CARRIER-PHASE POSITIONING IN CELLULAR NETWORKS," filed May 31, 2018, assigned to the assignee hereof, and expressly incorporated herein by reference in its entirety

TECHNICAL FIELD

Aspects of this disclosure relate generally to telecommunications, and more particularly to carrier-phase positioning in cellular networks.

BACKGROUND

Wireless communication systems are widely deployed to provide various types of communication content, such as voice, data, multimedia, and so on. Some wireless communication systems also facilitate position determination. For example, in Satellite Positioning Systems (SPS), an SPS transmitter (for example, a satellite) may continuously broadcast, from a known location, a pseudo-random noise (PRN) code that is modulated using an SPS carrier wave. Particular examples of SPS wireless technologies may include, for example, the Global Positioning System (GPS), the Global Navigation Satellite System (GLONASS), etc.

An SPS receiver may receive the PRN code from one or more SPS transmitters. The broadcast of the PRN code from the SPS transmitter may have a known start time and the PRN code may repeat after a known period length. Accordingly, the mobile device may receive the broadcast and obtain a time-of-flight (TOF) measurement. The SPS receiver first generates a local version of the PRN code having the same symbol sequence and start time as the PRN code broadcast by the SPS transmitter. The SPS receiver then receives the PRN code broadcast by the SPS transmitter and compares the received version of the PRN code to the local version of the PRN code. The SPS receiver may then determine a code-phase of the received PRN code by evaluating the amount of delay between the time that the local PRN code is generated and the time that the received PRN code is received. A larger code-phase indicates a longer TOF and a greater distance from the SPS transmitter to the SPS receiver. The calculated distance from a particular SPS transmitter may be referred to as a pseudorange. Multiple pseudoranges may be used to multilaterate and identify a position of the SPS receiver.

The code-phase measurements described above may be used to sense a position of the SPS receiver with precision on the order of several meters. The precision of the sensed position may be limited by the frequency at which the PRN code is repeated (i.e., broadcast and re-broadcast). However, the SPS receiver can achieve greater precision using carrier-phase measurements in addition to code-phase measurements. The PRN code may be provided on a carrier wave having a significantly higher frequency than the PRN code. Because the frequency of the carrier wave is greater than the frequency of the code cycle, position sensing that is based on carrier-phase measurements may be more precise than position sensing based on code-phase measurements. In particular, the SPS receiver may be able to sense position with precision on the order of several centimeters. However, due to the repeating nature of the carrier wave, it is necessary to resolve an integer ambiguity (IA) before sensing position using carrier-phase measurements. Once the IA is resolved, the carrier phase tracking loops must be continuously locked in order to enable continued resolution of the IA.

As noted above, the PRN code is broadcast continually. Continuous broadcast greatly facilitates locking of the carrier wave and continued resolution of the IA resolution. There have been efforts to use existing wireless architectures to provide positioning services and/or augment the positioning services available using SPS. However, many existing wireless communication standards operate in accordance with a time-division duplexing (TDD) wireless architecture, which makes it difficult to maintain a lock on the carrier wave. This is because in TDD systems, a base station (BS) does not broadcast continuously. For example, certain periods of time may be reserved for downlink (i.e., signaling from the BS to a user equipment (UE)), while the remaining periods of time may be reserved for uplink (i.e., signaling from the UE to the BS). The BS may observe radio silence during uplink in order to limit interference with uplink signaling received from the UE. The BS may be configured to cease broadcast of downlink signaling so often that the IA is not resolvable (or alternatively, not resolved long enough to be useful).

As a result, the conventional carrier-phase measurements that are obtainable in SPS may not be obtainable in other wireless architectures, particularly those that rely on TDD. For example, the forthcoming Fifth Generation (5G) wireless architecture may ultimately utilize TDD. Whatever the advantages of the non-continuous signaling, TDD systems that implement non-continuous signaling are not well-equipped to facilitate high-precision carrier-phase measurements of the kind used in SPS. New techniques are required if TDD signaling is to be adapted for purposes of obtaining carrier-phase measurements.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In accordance with an aspect of the disclosure, a user equipment (UE) is disclosed. The UE may comprise at least one transceiver, a memory system, and a processing system. The at least one transceiver may be configured to receive one or more downlink signals transmitted from a base station (BS) during a downlink period, wherein the downlink signals are modulated using a downlink carrier wave. The memory system may be configured to store data, instructions, or a combination thereof. The processing system may be coupled to the memory system and may be configured to measure, during the downlink period, a first carrier phase associated with the downlink carrier wave, estimate, during an uplink period subsequent to the downlink period, an integer ambiguity (IA) change, and measure, during a later downlink period subsequent to the uplink period, a second carrier phase based on the measured first carrier phase and the estimated IA change.

In accordance with another aspect of the disclosure, a method is disclosed. The method may comprise receiving one or more downlink signals transmitted from a base station (BS) during a downlink period, wherein the downlink signals are modulated using a downlink carrier wave, measuring, during the downlink period, a first carrier phase associated with the downlink carrier wave, estimating, during an uplink period subsequent to the downlink period, an integer ambiguity (IA) change, and measuring, during a later downlink period subsequent to the uplink period, a second carrier phase based on the measured first carrier phase and the estimated IA change.

In accordance with yet another aspect of the disclosure, an apparatus is disclosed. The apparatus may comprise means for receiving one or more downlink signals transmitted from a base station (BS) during a downlink period, wherein the downlink signals are modulated using a downlink carrier wave, means for measuring, during the downlink period, a first carrier phase associated with the downlink carrier wave, means for estimating, during an uplink period subsequent to the downlink period, an integer ambiguity (IA) change, and means for measuring, during a later downlink period subsequent to the uplink period, a second carrier phase based on the measured first carrier phase and the estimated IA change.

In accordance with yet another aspect of the disclosure, a non-transitory computer-readable medium is disclosed. The non-transitory computer-readable medium may comprise at least one instruction for causing a processor to perform operations. The at least one instruction may comprise code for receiving one or more downlink signals transmitted from a base station (BS) during a downlink period, wherein the downlink signals are modulated using a downlink carrier wave, code for measuring, during the downlink period, a first carrier phase associated with the downlink carrier wave, code for estimating, during an uplink period subsequent to the downlink period, an integer ambiguity (IA) change, and code for measuring, during a later downlink period subsequent to the uplink period, a second carrier phase based on the measured first carrier phase and the estimated IA change.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
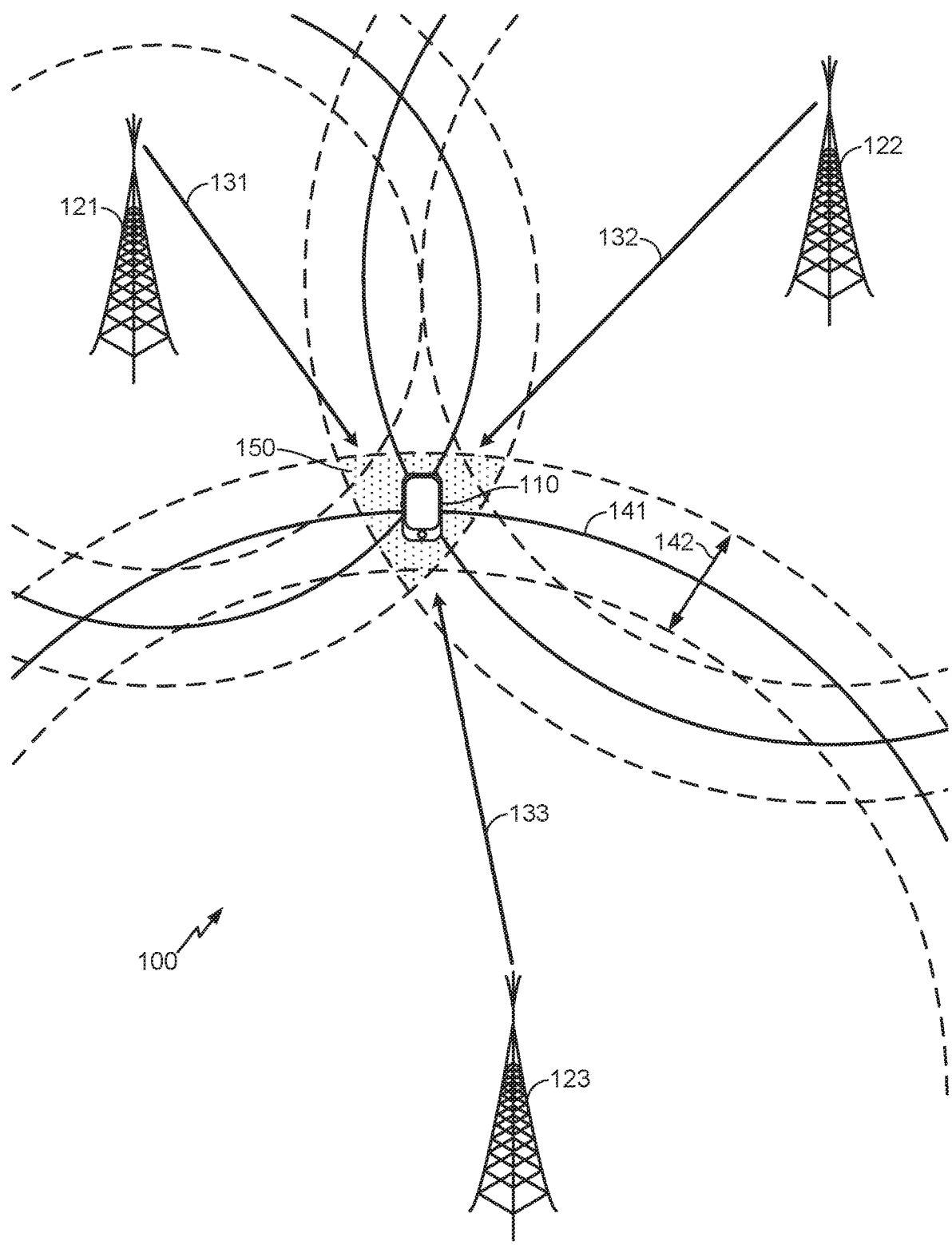
FIG. 1 generally illustrates a wireless environment in accordance with aspects of the disclosure.

Various aspects described herein generally relate to wireless communication systems, and more particularly, to determining carrier-phase positioning in cellular networks.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As noted above, new techniques are required if TDD signaling is to be adapted for purposes of obtaining carrier-phase measurements. Once the downlink carrier wave is locked and an IA associated with the downlink carrier wave is resolved, the UE may determine its position with high precision. However, each downlink period associated with the TDD wireless architecture may be separated from the next downlink period by an uplink gap, during which lock on the downlink carrier wave is lost and the ambiguity associated with the IA reasserts itself. In accordance with aspects of the disclosure, various methods to bridge the uplink gap are proposed.

In accordance with a first technique, the BS is configured to limit or reduce the duration of the uplink gap by replacing a default TDD schedule with a modified TDD schedule. The modified TDD schedule may include uplink gaps of a reduced or limited duration. As a result, the UE may conclude that there has been no change of the IA between the time that a first downlink period ended and the time that a next downlink period began. In some implementations, the BS may modify the default TDD schedule in response to a request for positioning services received from the UE. The BS may therefore, upon request, operate in accordance with the modified TDD schedule, thus enabling the UE to bridge the uplink gaps and obtain high-precision position determinations.

In accordance with a second technique, the BS may operate in accordance with the default TDD schedule without any modification (that is, with at least one uplink gap of relatively longer duration). The UE may use an inertial motion unit to track its relative position (direction and velocity) during uplink periods. If during the uplink period the UE moves toward the BS, the UE may be configured to estimate that the previously resolved value of the IA has decreased. If during the uplink period the UE moves away from the BS, then the UE may be configured to estimate that the previously resolved value of the IA has increased. Once the uplink period is over, the UE may calculate a new value of the IA based on the previously resolved value of the IA and the estimated IA change.

FIG. 1 generally illustrates a wireless environment 100 in accordance with aspects of the disclosure. Depicted in the wireless environment 100 are a UE 110, a first base station 121, a second base station 122, and a third base station 123. The first base station 121, the second base station 122, and the third base station 123 may be collectively referred to as "base stations 120".

Each of the base stations 120 may transmit signals in accordance with a time-division duplexing (TDD) wireless architecture. During an uplink period, the base station may receive from the UE 110 at least one uplink signal modulated using at least one uplink carrier wave. During a downlink period, the base station may transmit to the UE 110 at least one downlink signal modulated using at least one downlink carrier wave. FIG. 1 depicts a first downlink signal 131 transmitted by the first base station 121, a second downlink signal 132 transmitted by the second base station 122, and a third downlink signal 133 transmitted by the third base station 123. The first downlink signal 131, the second downlink signal 132, and the third downlink signal 133 may be collectively referred to as "downlink signals 130".

As noted above, each of the downlink signals 130 may be transmitted on a downlink carrier wave having a pre-defined frequency. As used herein, the term "frequency" may refer to a bandwidth that includes a range of frequencies. For example, depending on the context, a frequency of "3 GHz" may refer to the specific frequency value of 3 GHz or a band of frequencies centered around 3 GHz.

The UE 110 may measure times of arrival (TOA) $\tau_1$, $\tau_2$, and $\tau_3$, corresponding respectively to the first downlink signal 131, the second downlink signal 132, and the third downlink signal 133. Each TOA may be measured with respect to an internal time base of the UE 110. Once the three TOAs $\tau_1$, $\tau_2$, and $\tau_3$ have been determined, one of the three values may be selected as a reference value. For example, the value $\tau_1$, corresponding to the first downlink signal 131, may be selected as the reference value. This value may be selected because, for example, it is received from a serving base station, or for any other suitable reason. The reference value ($\tau_1$) may be subtracted from each of the remaining values ($\tau_2$ and $\tau_3$) to produce a pair of Reference Signal Time Difference (RSTD) measurements. In particular, a first RSTD value may be equal to $\tau_1-\tau_2$ and a second RSTD value may be equal to $\tau_1-\tau_3$. Using the RSTDs, the UE 110 may be configured to infer a distance from each of the base stations 120 and determine the position of the UE 110 based on the inferred distances. Position sensing that is performed in this manner may be referred to as an Observed Time Difference of Arrival (OTDOA) technique.

Each of the base stations 120 may be associated with a curve 141 defining a set of possible locations. The thickness of the curve 141 may be associated with a measurement uncertainty 142. The curve 141, as it is labeled in FIG. 1, surrounds the third base station 123. However, it will be understood that the first base station 121 and the second base station 122 have curves and measurement uncertainties (depicted but not labeled) that are analogous to the curve 141 and the measurement uncertainty 142. The UE 110 may be configured to establish, using OTDOA, that the position of the UE 110 is within an area of uncertainty 150. The area of uncertainty 150 may be a location where each of the respective curves intersect. The precision of the position sensing (and thus the size of the area of uncertainty 150) may depend on the degree of the measurement uncertainty 142. As noted above, carrier-phase measurements are useful for high-precision distance determination. Accordingly, the carrier-phase measurement techniques set forth in the present disclosure may serve to limit the measurement uncertainty 142 and reduce the size of the area of uncertainty 150.

Figure 2A:
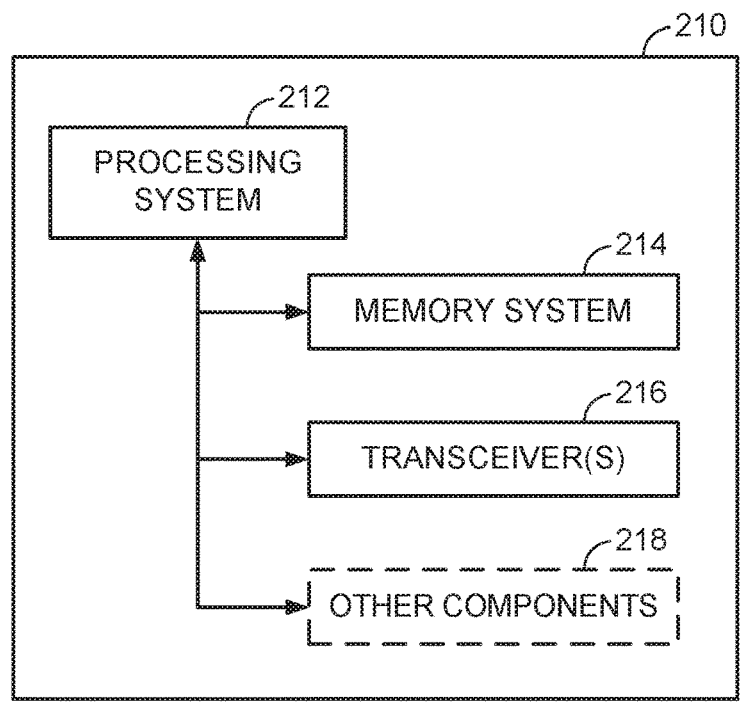
FIG. 2A generally illustrates a UE in accordance with aspects of the disclosure.

FIG. 2A generally illustrates a UE 210 in accordance with aspects of the disclosure. The UE 210 may be analogous to the UE 110 depicted in FIG. 1. The UE 210 depicted in FIG. 2A includes a processing system 212, a memory system 214, and at least one transceiver 216. The UE 210 may optionally include other components 218. As will be discussed in greater detail below, in some implementations the other components 218 may include an aiding sensor (for example, gyroscopes, accelerometers, an inertial motion unit (IMU), a wheel speed sensor, or a camera).

The processing system 212 may include one or more microprocessors, microcontrollers, and/or digital signal processors that provide processing functions, as well as other calculation and control functionality. The memory system 214 may be configured to store data and/or instructions for executing programmed functionality within the UE 210. The memory system 214 may include on-board memory that is, for example, in a same integrated circuit package as the processing system 212. Additionally or alternatively, the memory system 214 may include memory that is external to the processing system 212 and functionally coupled over a common bus.

The at least one transceiver 216 may be configured to receive one or more downlink signals transmitted from a base station during a downlink period associated with a TDD wireless architecture. The at least one transceiver 216 may be further configured to transmit one or more uplink signals to the base station during an uplink period associated with the TDD wireless architecture. The downlink signals may be modulated using a downlink carrier wave, and the uplink signals may be modulated using an uplink carrier wave.

In some implementations, the at least one transceiver 216 may comprise one or more antennas, one or more modulators, one or more demodulators, one or more filters, a transceiver clock, and/or any other suitable hardware. The at least one transceiver 216 may further comprise any suitable hardware and/or software for receiving, processing, and/or storing the received positioning signals. In some implementations, the at least one transceiver 216 may comprise a transceiver processor and/or a transceiver memory that are analogous in some respects to the processing system 212 and the memory system 214 described above. For example, certain tasks that would otherwise be performed by the processing system 212 and the memory system 214 may be offloaded to the transceiver processing system and/or the transceiver memory system associated with the at least one transceiver 216. It will be understood that any reference to a processing system or a memory system herein may refer to the processing system 212 and the memory system 214, the transceiver processing system and the transceiver memory system, or any combination thereof.

It will be understood that the UE 210 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in an automotive vehicle, and/or any other device with a need for position sensing capability. As such, the UE 210 may include any number of other components 218. As noted above, the other components 218 may comprise an aiding sensor. The aiding sensor may be configured to track relative movement (for example, speed and/or direction) of the UE 210. The other components 218 may further comprise, for example, wide area network transceivers, local area network transceivers, or any other components suitable for inclusion in a device such as the UE 210.

Figure 2B:
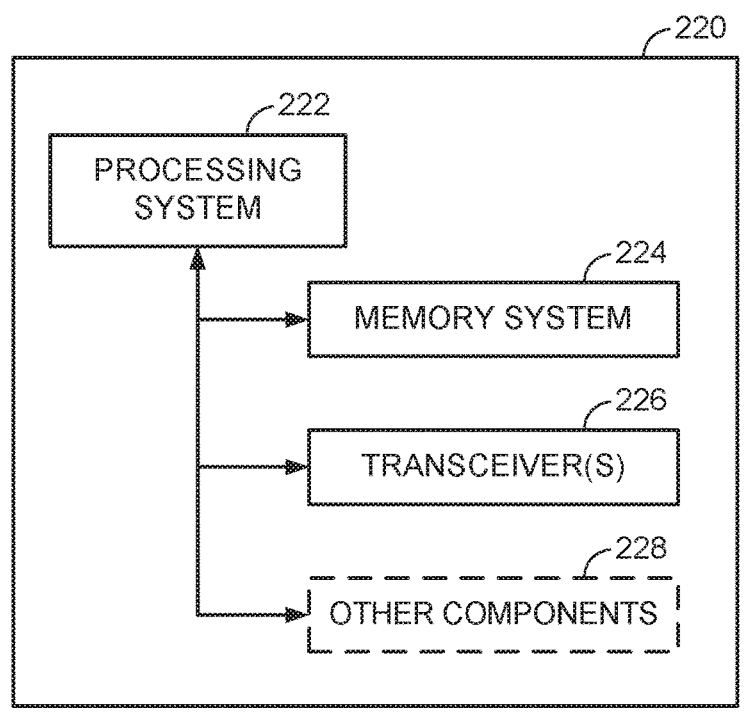
FIG. 2B generally illustrates a base station in accordance with aspects of the disclosure.

FIG. 2B generally illustrates a base station 220 in accordance with aspects of the disclosure. The base station 220 may be analogous to one or more of the base stations 120 depicted in FIG. 1. In some implementations, the base station 220 may be a next-generation NodeB (abbreviated as gNB) that operates in accordance with a 5G wireless architecture.

The base station 220 depicted in FIG. 2B includes a processing system 222, a memory system 224, and at least one transceiver 226. Each of the processing system 222, the memory system 224, and the at least one transceiver 226 may be analogous in some respects to the processing system 212, the memory system 214, and the at least one transceiver 216 depicted in FIG. 2A, respectively. The base station 220 may optionally include other components 228.

The at least one transceiver 226 may be configured to receive one or more uplink signals transmitted from, for example, the UE 210 depicted in FIG. 2A. The at least one transceiver 226 may be further configured to receive one or more downlink signals from the UE 210 during an uplink period associated with a TDD wireless architecture. The downlink signals may be modulated using a downlink carrier wave, and the uplink signals may be modulated using an uplink carrier wave.

Figure 2C:
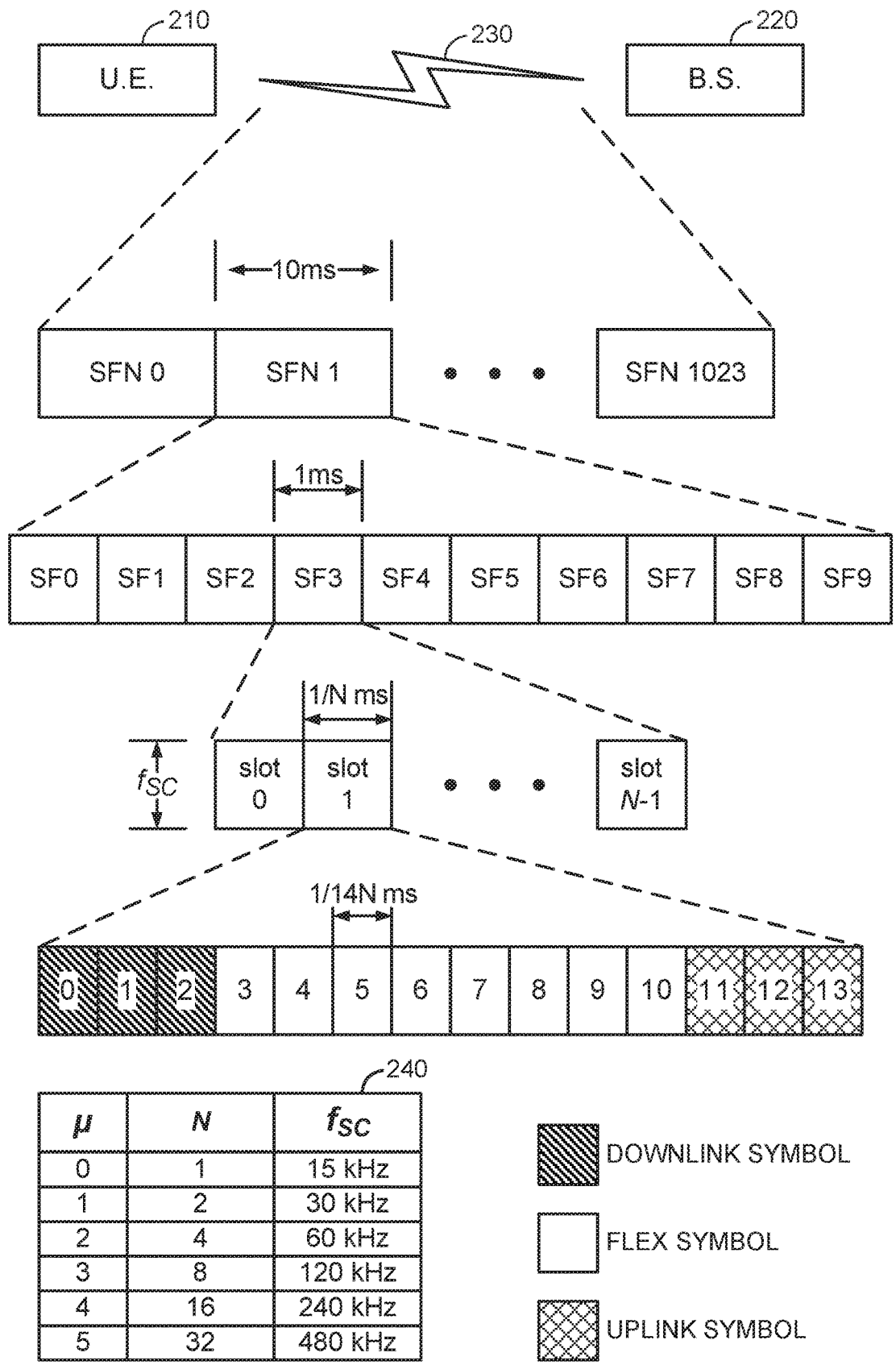
FIG. 2C generally illustrates a TDD frame structure that the UE and the base station depicted in FIGS. 2A-2B may utilize for wireless communication in accordance with aspects of the disclosure.

FIG. 2C generally illustrates a TDD frame structure 230 that the UE 210 and the base station 220 depicted in FIGS. 2A-2B may utilize for wireless communication in accordance with aspects of the disclosure. The TDD frame structure 230 may be, for example, a 5G TDD frame structure.

The TDD frame structure 230 may comprise a series of radio frames that are indexed in accordance with a System Frame Number (SFN) numerology (SFN N, N+1, N+2, etc.). In the example of FIG. 2C, the TDD frame structure 230 has one thousand and twenty-four radio frames, each radio frame having a duration of ten milliseconds. Each radio frame may be divided into subframes (SFs), which may also be indexed (e.g., SF0, SF1, etc.). In the example of FIG. 2C, each radio frame in the TDD frame structure 230 is constituted by ten subframes, each subframe having a duration of one millisecond.

Each respective subframe may be further divided into slots. Unlike previous architectures, which specify a fixed number of slots per subframe (for example, two), 5G may have multiple configurations p, wherein each configuration p may be associated with a particular number N of slots per subframe. FIG. 2C depicts a configuration chart 240 showing various configurations ($\mu=0$, $\mu=1$, $\mu=2$, etc.) and the specified number of slots per subframe associated with each configuration (N=1, N=2, N=4, etc.). As will be further understood from FIG. 2C, the configuration chart 240 may also specify for each configuration p a particular subcarrier spacing $f_{SC}$. For example, configuration $\mu=2$ may correspond to N=4 and $f_{SC}=60$ kHz. Although FIG. 2C depicts a subframe that includes four or more slots (numbered 0, 1 . . . N–1), it will be understood that in certain configurations (for example, $\mu=0$ and $\mu=1$) there may be fewer than four slots (for example, one or two).

Different configurations p may be suitable for different environments. For example, macrocell coverage may use frequencies below 3 GHz. Accordingly, the narrower subcarrier spacing associated with $\mu=0$, $\mu=1$, or $\mu=2$ may be optimal for macrocell coverage. By contrast, $\mu=3$ may be more suitable for small cell coverage implemented on frequencies at or above 3 GHz, $\mu=4$ may be suitable for indoor wideband coverage near frequencies around 5 GHz, and $\mu=5$ may be suitable for millimeter wave (mmW) coverage at, for example, 28 GHz.

Each slot may be further divided into symbol periods. In the example of FIG. 2C, there are fourteen symbols per slot, regardless of the configuration p being used. Each symbol may be reserved for uplink, reserved for downlink, or reserved for flexible scheduling (i.e., selectable for scheduling as uplink or downlink, as required). FIG. 2C depicts a particular slot configuration in which the first three symbols are reserved for downlink, the last three symbols are reserved for uplink, and the eight symbols in between are reserved for flexible scheduling. However, it will be understood that there are many possible slot configurations.

The slot configuration depicted in FIG. 2C includes a downlink period of between three and eleven symbol periods and an uplink gap consisting of between three and eleven symbol periods. For example, if all eight of the flex symbol periods are reserved for uplink, the downlink period may consist of three symbol periods and the uplink gap may consist of eleven symbol periods. By contrast, the uplink gap may be as small as three symbol periods.

As noted above, once the downlink carrier wave is locked and an IA associated with the downlink carrier wave is resolved, the UE 210 may determine its position with high precision using carrier-phase measurements. However, during the uplink gap, lock on the downlink carrier wave may be lost and the ambiguity associated with the IA reasserts itself, thereby preventing carrier-phase measurements until the next downlink period arrives and the IA is resolved. As will be discussed in greater detail below, the methods depicted in FIGS. 4-7 may be used to bridge the uplink gap associated with conventional TDD systems.

Figure 3:
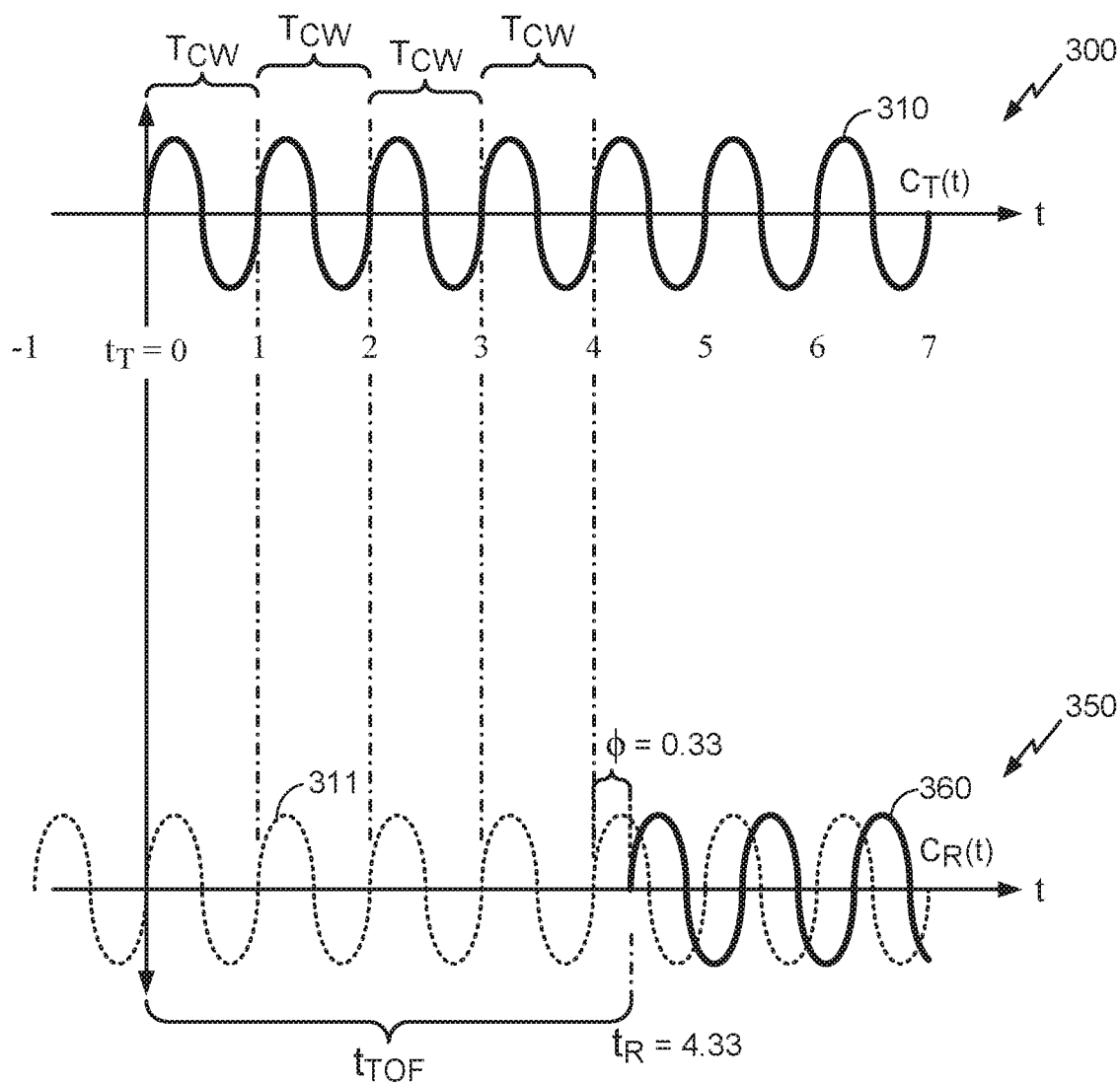
FIG. 3 generally illustrates an example carrier wave transmission and an example carrier wave reception that shows a measurable delay associated with TOF.

FIG. 3 generally illustrates an example carrier wave transmission 300 and an example carrier wave reception 350 that shows a measurable delay associated with TOF.

Carrier wave transmission 300 may include transmission of a carrier wave transmission pattern 310. The transmission of the carrier wave transmission pattern 310 may be performed by the at least one transceiver 226 of the base station 220 depicted in FIG. 2B. Moreover, the waveform associated with the downlink carrier wave may be denoted as $C_T(t)$. The downlink carrier wave may have a repeating carrier wave cycle with a duration $T_{CW}$. For simplicity of illustration. FIG. 3 shows a carrier wave transmission pattern 310 wherein the period $T_{CW}$ is equal to one arbitrary unit (AU) and a transmission start time $t_T$ is equal to zero.

Carrier wave reception 350 may include reception at the UE 210 (using the at least one transceiver 216) of the carrier wave transmission pattern 310 transmitted by the base station 220. The period $T_{CW}$ and the transmission start time $t_T$ of the carrier wave transmission pattern 310 may be known to the UE 210. Accordingly, as shown in FIG. 3, the UE 210 may be configured to generate a local replica 311 of the carrier wave transmission pattern 310.

The carrier wave may have a non-zero time of flight (TOF) that is proportional to the distance from the base station 220 to the UE 210. In the example of FIG. 3, the time of flight is associated with a delay $t_{TOF}$ equal to 4.33 AU. Accordingly, the carrier wave reception pattern 360 is identical to the local replica 311 except that the carrier wave reception pattern 360 begins at a reception start time $t_R$=4.33 AU, wherein $t_R$ is equal to $t_T$ (0.00 AU) plus $t_{TOF}$ (4.33 AU).

Each cycle of the carrier wave transmission pattern 310 may be identical, making it difficult to distinguish the first cycle (transmitted at, for example, $t_T$=0.00 AU from a subsequent cycle (transmitted at, for example, t=1.00 AU, t=2.00 AU, etc.). However, the phase difference φ between the local replica 311 and the carrier wave reception pattern 360 may be measured as a fraction of a cycle. Accordingly, a simple measurement of the phase difference φ may only constitute a fraction of the delay $t_{TOF}$. The remainder of the delay $t_{TOF}$ may consist of a plurality of full cycles (each having a duration of $T_{CW}$) of the repeating carrier wave. Accordingly, the delay $t_{TOF}$ may include the measured phase difference φ and an unknown integer number of full cycles of the carrier wave. The unknown integer number of full cycles may be referred to as an integer ambiguity and may be denoted IA. Accordingly, a precise estimate of the delay $t_{TOF}$ can be determined based on the equation $t_{TOF}$=$T_{CW}$* (IA+φ), where $T_{CW}$ is predetermined and known, and φ can be measured. However, the integer ambiguity IA must be resolved before the delay $t_{TOF}$ can be determined.

There are several available techniques for resolving IA. For example, a double differences technique uses two antennas, wherein each antenna measures, at a particular time, a first phase difference $φ_1$ associated with a first transmitting device and a second phase difference $φ_2$ associated with a second transmitting device. The difference between the first phase difference $φ_1$ and the second phase difference $φ_2$ is determined for each antenna, and the difference between the differences is calculated to generate an observation vector. A plurality of observation vectors are generated over a particular duration. For brevity, the details will be omitted here, but it will be understood that with a sufficiently large number of observations (over a sufficiently long period of time) from a sufficiently large number of transmitting devices, mathematical techniques can be used to determine IA. Other techniques apart from the double differences technique are available for resolving IA, but it will be understood that these other techniques also require a large number of observations over a long period of time. Accordingly, integer ambiguity resolution according to known techniques can be computationally intensive and time-consuming.

Once received, the carrier wave reception pattern 360 may be provided to a tracking loop. The tracking loop may be, for example, a phase-locked loop (PLL) or an automatic frequency control (AFC) loop. In a PLL, for example, negative feedback may be used to modify an oscillator frequency in response to a determination that the phase of the oscillator has drifted relative to the phase of the input. The PLL may comprise, in series, a phase detector and a voltage controlled oscillator (VCO). The output of the VCO may be fed back to the phase detector, which generates a voltage proportional to the phase difference between the input frequency and the feedback frequency. In some implementations, the PLL may include a low pass filter between the phase detector and the VCO. The measurement generated by the PLL may comprise the output of the VCO. The measurement generated by the PLL may have a frequency and phase equivalent to the frequency and phase of the input provided to the PLL (i.e., the carrier wave reception pattern 360).

The tracking loop may lock the carrier wave reception pattern 360, enabling the UE 210 to resolve and/or maintain resolution of the IA. However, if the carrier wave reception pattern 360 stops (during, for example, an uplink gap associated with the TDD frame structure 230 depicted in FIG. 2C), then the lock is lost, and the IA reasserts itself.

Figure 4:
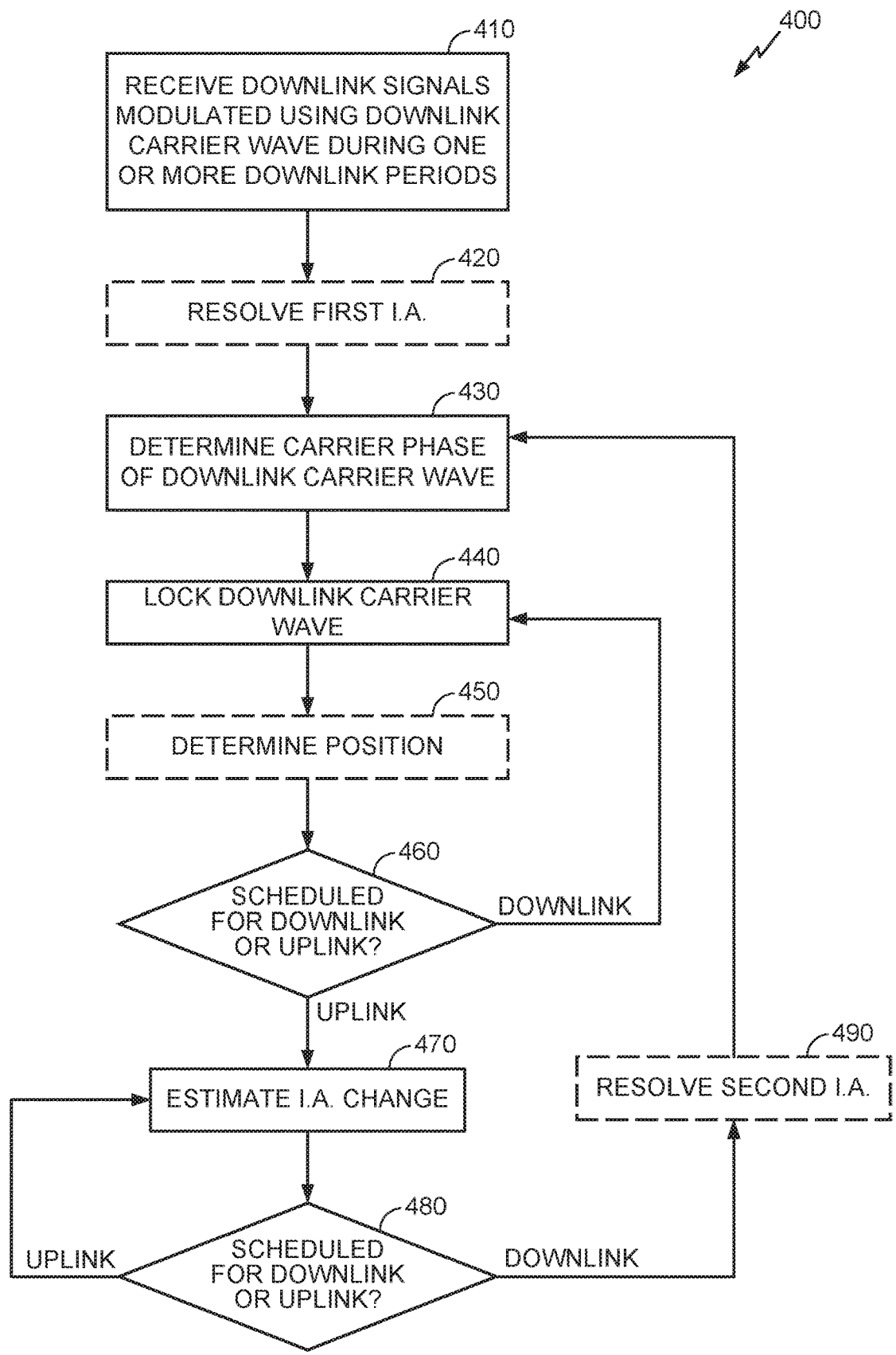
FIG. 4 generally illustrates a method for determining, at the UE depicted in FIG. 2A, a pseudorange associated with the BS depicted in FIG. 2B, wherein the determining is performed by bridging at least one uplink gap associated with the TDD frame structure depicted in FIG. 2C.

FIG. 4 generally illustrates a method 400 for determining, at the UE 210 depicted in FIG. 2A, a pseudorange associated with the base station 220 depicted in FIG. 2B, wherein the determining is performed by bridging at least one uplink gap associated with the TDD frame structure 230 depicted in FIG. 2C.

At 410, the UE 210 receives downlink signals modulated using a downlink carrier wave. The downlink carrier wave may be analogous to the carrier wave that is transmitted and received as depicted in FIG. 3. The receiving at 410 may be performed by, for example, the at least one transceiver 216 depicted in FIG. 2A. Accordingly, the at least one transceiver 216 may constitute means for receiving downlink signals transmitted from a base station during one or more downlink periods, wherein the downlink signals are modulated using a downlink carrier wave.

At 420, the UE 210 optionally resolves a first integer ambiguity (IA). The resolving at 420 may be performed in accordance with any suitable method by, for example, the processing system 212 and/or the memory system 214 depicted in FIG. 2A. Accordingly, the processing system 212 and/or the memory system 214 may constitute means for resolving a first IA.

At 430, the UE 210 determines a carrier phase of the downlink carrier wave. The determining at 420 may be performed by, for example, the at least one transceiver 216 depicted in FIG. 2A. Additionally or alternatively, the processing system 212 and/or memory system 214 may perform the determining at 430. Accordingly, the processing system 212, the memory system 214, the at least one transceiver 216, or any combination thereof may constitute means for determining a carrier phase of a downlink carrier wave.

At 440, the UE 210 locks (and/or maintains a lock on) the downlink carrier wave received at 410. The locking may be performed by, for example, the processing system 212 and/or memory system 214 depicted in FIG. 2A. To perform the locking, the processing system 212 and/or memory system 214 may implement a tracking loop using components such as the PLL or AFC loop described above. Accordingly, the processing system 212 and/or memory system 214 may constitute means for locking the downlink carrier wave. As noted above, the IA resolved at 420 may remain resolved for as long as the tracking loop maintains the lock.

At 450, the UE 210 optionally determines a position of the UE 210. The determining at 450 may be performed by, for example, the processing system 212 and/or memory system 214 depicted in FIG. 2A. Accordingly, the processing system 212 and/or memory system 214 may constitute means for determining a position.

If the IA is resolved at 420 (or at 490, as will be discussed in greater detail below), the UE 210 may determine the position at 450 by determining a pseudorange from the UE 210 to the base station 220. As noted above, the resolved IA may reflect the number of full cycles included in the delay associated with the TOF and the determined carrier phase may reflect a fraction of one cycle in the delay associated with the TOF. If there is no resolved IA, the UE 210 may determine the position at 450 by determining a relative position of the UE 210. A displacement of the UE 210 from time $t_1$ to time $t_2$ may be calculated from $\phi(t_1)-\phi(t_2)-\lambda^*m$, where $\phi(t_1)$ is a phase measurement at time $t_1$, $\phi(t_2)$ is a phase measurement at time $t_2$, $\lambda$ is carrier wavelength, and m is the IA change. Estimation of the IA change m may be performed as described below in relation to block 470, FIG. 6, and/or FIG. 7.

At 460, the UE 210 determines whether the UE 210 is scheduled for downlink or uplink. The determining may be performed by, for example, the processing system 212 and/or memory system 214 depicted in FIG. 2A. Accordingly, the processing system 212 and/or memory system 214 may constitute means for determining whether the UE 210 is scheduled for downlink or uplink. If the UE 210 determines at 460 that the UE 210 is scheduled for downlink ('downlink' at 460), then the UE 210 returns to the locking at 440. If the UE 210 determines at 460 that the UE 210 is scheduled for uplink ('uplink' at 460), then the UE 210 proceeds to 470.

Figure 6:
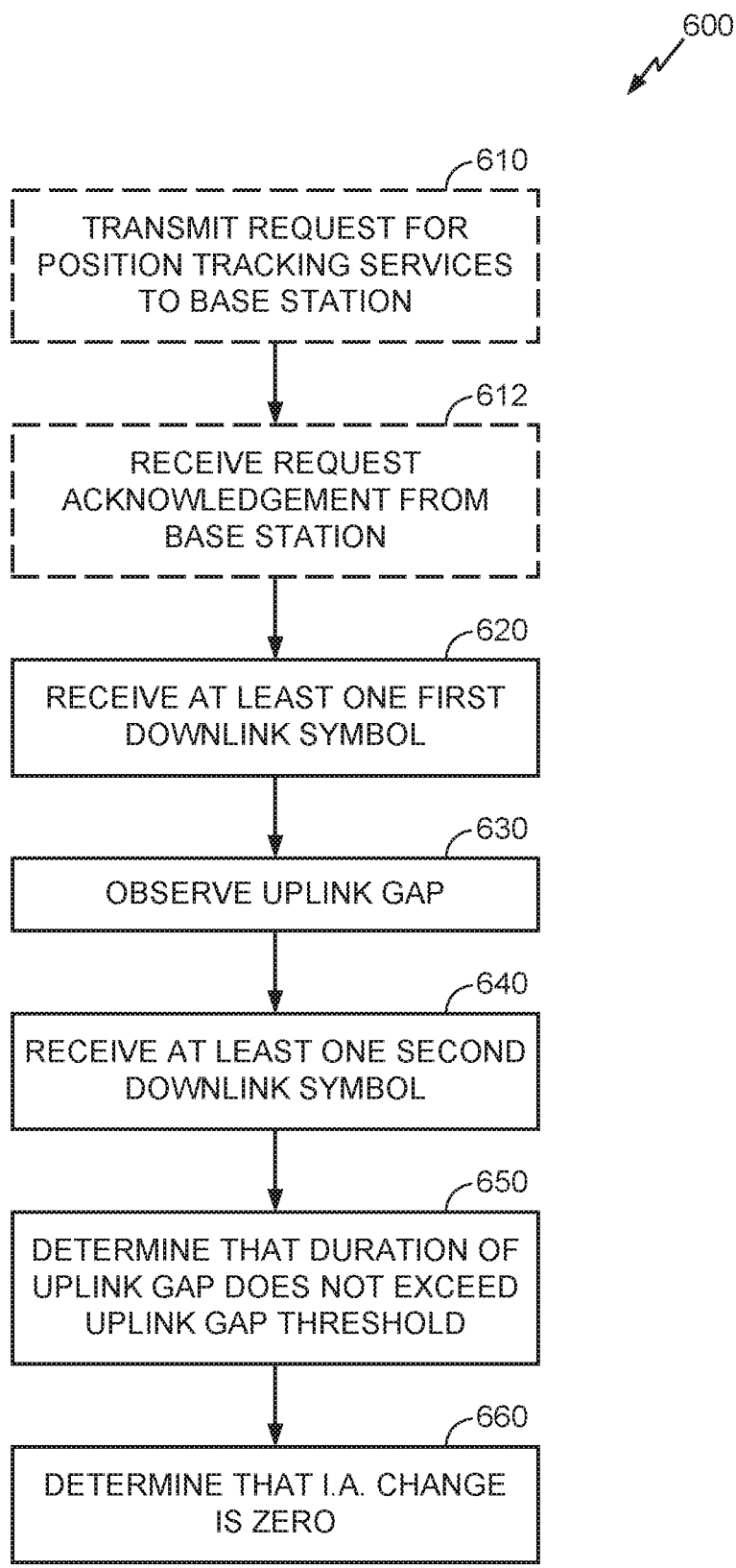
FIG. 6 generally illustrates a method performed by the BS depicted in FIG. 2B for modifying a TDD schedule such that at least one uplink gap has a reduced or limited duration.
Figure 7:
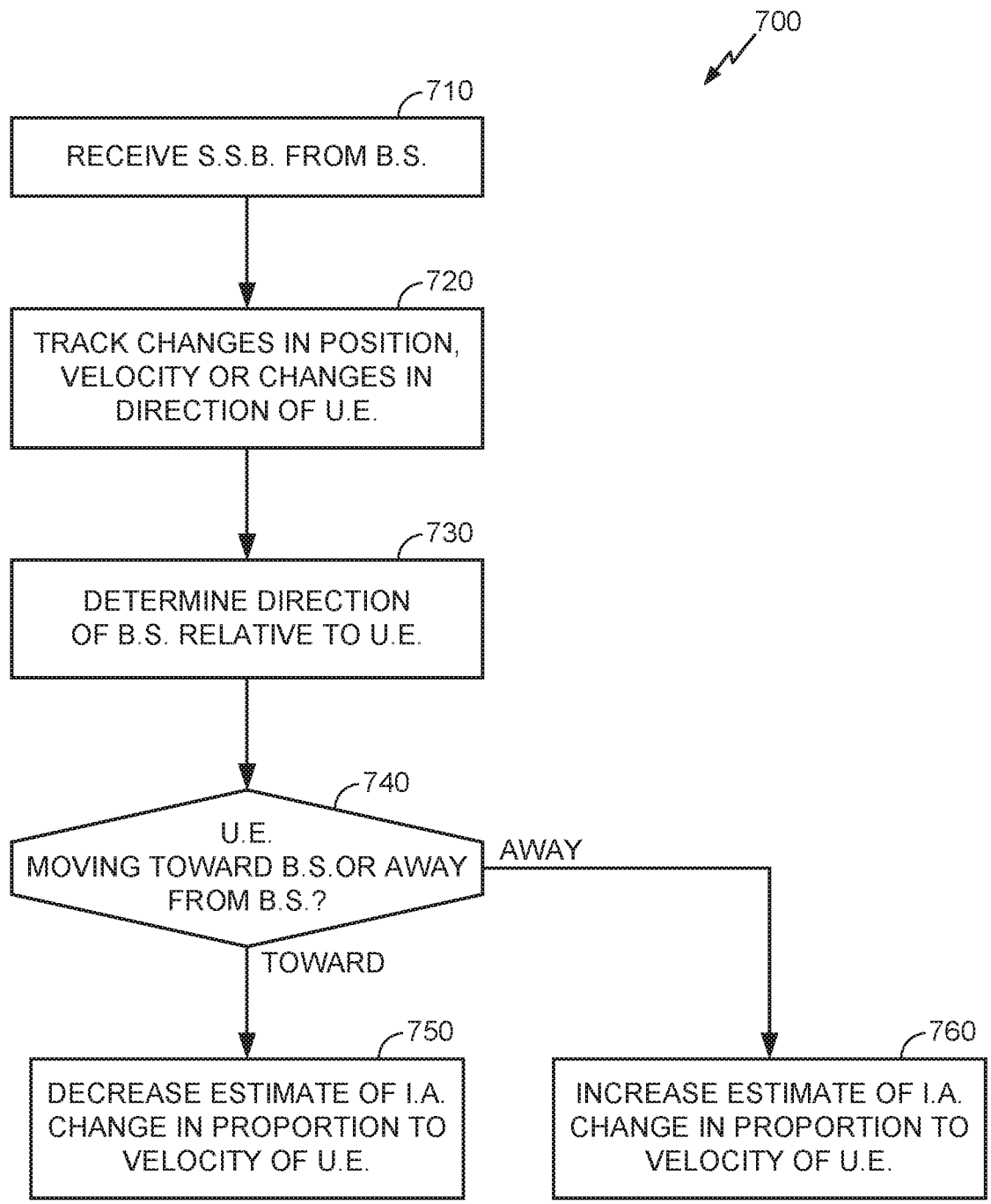
FIG. 7 generally illustrates another method performed by the UE depicted in FIG. 2A to perform the estimating of the IA change depicted in FIG. 4.

At 470, the UE 210 estimates an IA change over the duration of at least a portion of the uplink period. The estimating at 470 may be performed by, for example, the processing system 212 and/or memory system 214 depicted in FIG. 2A. Accordingly, the processing system 212 and/or memory system 214 may constitute means for estimating a change in IA. The estimating at 470 may be implemented as depicted in FIGS. 6-7, as will be discussed in greater detail below.

At 480, the UE 210 determines whether the UE 210 is scheduled for downlink or uplink. The determining may be analogous to the determining at 460 and may be performed by, for example, the processing system 212 and/or memory system 214 depicted in FIG. 2A. Accordingly, the processing system 212 and/or memory system 214 may constitute means for determining whether the UE 210 is scheduled for downlink or uplink. If the UE 210 determines at 480 that the UE 210 is scheduled for uplink ('uplink' at 480), then the UE 210 returns to the estimating at 470. If the UE 210 determines at 480 that the UE 210 is scheduled for downlink ('downlink' at 480), then the UE 210 proceeds to 490.

At 490, the UE 210 optionally resolves a second IA. The resolving at 490 may be performed by, for example, the processing system 212 and/or memory system 214 depicted in FIG. 2A. Accordingly, the processing system 212 and/or the memory system 214 may constitute means for resolving a second IA.

It will be understood that the technique for resolving the second IA at 490 may differ from the technique for resolving the first IA at 420. In particular, resolution of the first IA at 420 may be computationally intensive and time-consuming (for example, by implementing a double difference technique, as described above). By contrast, resolution of the second IA at 490 may be less computationally intensive and less time-consuming. For example, to resolve the second IA at 490, the UE 210 may simply add the change in IA estimated at 470 to the value of the first IA resolved at 420. The change in IA estimated at 470 may be estimated in accordance with the method 600 depicted in FIG. 6 or the method 700 depicted in FIG. 7, as will be discussed in greater detail below.

Figure 5:
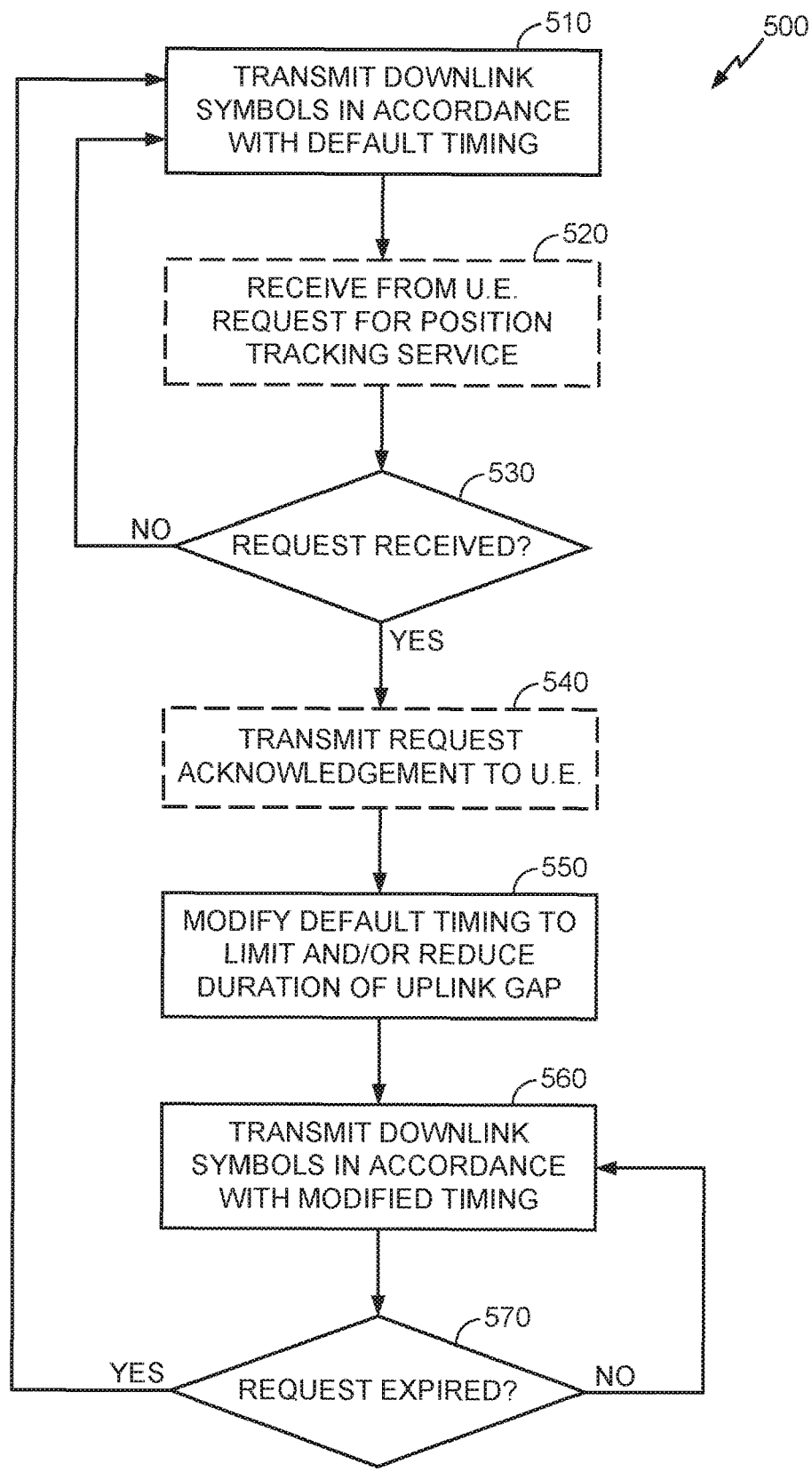
FIG. 5 generally illustrates a method performed by the UE depicted in FIG. 2A to perform the estimating of the IA change depicted in FIG. 4.

FIG. 5 generally illustrates a method 500 performed by the BS 220 depicted in FIG. 2B for modifying a TDD schedule such that at least one uplink gap has a reduced or limited duration.

At 510, the BS 220 transmits downlink symbols in accordance with a default timing. The default timing may correspond to the timing of a particular standardized TDD frame structure associated with the absence of a request for position tracking service. The transmitting at 510 may be performed by, for example, the at least one transceiver 226 depicted in FIG. 2B. Accordingly, the at least one transceiver 226 may constitute means for transmitting downlink symbols in accordance with a default timing.

At 520, the BS 220 optionally receives from the UE 210 a request for position tracking service. For example, if the UE 210 transmits the request for position tracking service, then the BS 220 may receive the request at 520. The receiving may be performed by, for example, the at least one transceiver 226 depicted in FIG. 2B. Accordingly, the at least one transceiver 226 may constitute means for receiving a request for position tracking service.

At 530, the BS 220 determines whether a request for position tracking service has been received at 520. The determining at 530 may be performed by, for example, the processing system 222 and/or memory system 224 depicted in FIG. 2B. Accordingly, the processing system 222 and/or memory system 224 may constitute means for determining whether a request for position tracking service has been received. If the base station 220 determines that a request has not been received ('no' at 530), then the base station 220 may return to 510 and continue to transmit downlink symbols in accordance with the default timing. If the base station 220 determines that a request has been received ('yes' at 530), then the base station 220 may proceed to 540.

At 540, the BS 220 optionally transmits a request acknowledgement to the UE 210. The transmitting may be performed by, for example, the at least one transceiver 226 depicted in FIG. 2B. Accordingly, the at least one transceiver 226 may constitute means for transmitting a request acknowledgement to a UE. The transmitting at 540 is optional because in some implementations the UE 210 that transmits the request for position tracking service may simply assume that the request has been received and/or granted. In this case, the transmitting of the request acknowledgement at 540 is unnecessary.

At 550, the BS 220 modifies the default timing to limit and/or reduce a duration of an uplink gap. The modifying at 550 may be performed by, for example, the processing system 222 and the memory system 224 depicted in FIG. 2B. Accordingly, the processing system 222 and the memory system 224 may constitute means for modifying the default timing to limit and/or reduce a duration of an uplink gap.

At 560, the BS 220 transmits downlink symbols in accordance with the modified timing modified at 550. The transmitting at 560 may be performed by, for example, the at least one transceiver 226 depicted in FIG. 2B. Accordingly, the at least one transceiver 226 may constitute means for transmitting downlink symbols in accordance with a modified timing.

As will be discussed in greater detail below in relation to FIG. 6, the default timing may be modified at 550 such that an uplink gap has a duration that does not exceed an uplink gap threshold. As noted above, the UE 210 may be able to maintain resolution of the IA if it is able to bridge the uplink gap. When the base station 220 reduces and/or limits the duration of the uplink gap, the UE 210 may be better able to bridge the uplink gap. The particular value of the uplink gap threshold may be selected in any suitable manner, as will be discussed in greater detail below.

The base station may choose a default TDD timing in accordance with any suitable method. For purposes of illustration, suppose that the base station 220 operates in accordance with a $\mu$=1 TDD frame structure in which each symbol period has a duration of 35.7 $\mu$s. Suppose further that the base station 220 reserves the first nine symbol periods in each slot for downlink and reserves the five remaining symbol periods for uplink. This may result in a downlink period having a duration of 320 $\mu$s and an uplink period having a duration of 180 $\mu$s. If the particular value of the uplink gap threshold is selected as, for example, 120 $\mu$s, then the base station 220 must ensure that consecutive downlink periods are separated by three or fewer symbol periods (i.e., 113 $\mu$s or fewer). As a result, the base station 220 may modify the default timing such that the uplink symbol periods are eliminated and/or dispersed (i.e. separated by downlink symbols) within the slot. For example, the default timing may be modified such that symbol periods 0-2 are reserved for uplink, symbol periods 3-8 are reserved for downlink, symbol periods 9-10 are reserved for uplink, and symbol periods 11-13 are reserved for downlink. In this manner, the base station 220 may ensure that the uplink gap threshold is not exceeded, thereby providing position tracking service to the UE 210.

At 570, the BS 220 determines whether the request has expired. In some implementations, the request may expire automatically after a set period of time. Additionally or alternatively, the request may expire upon receiving an indication from the UE 210 that position tracking service is no longer needed. The determining at 570 may be performed by, for example, the processing system 222 and the memory system 224 depicted in FIG. 2B. Accordingly, the processing system 222 and the memory system 224 may constitute means for determining whether the request has expired. If the base station 220 determines that the request has not expired ('no' at 570), then the base station 220 may return to 560 and continue to transmit downlink symbols in accordance with the modified timing. If the base station 220 determines that the request has expired ('yes' at 570), then the base station 220 may return to 510 and commence to transmit downlink symbols in accordance with the default timing.

FIG. 6 generally illustrates a method 600 performed by the UE 210 depicted in FIG. 2A to perform the estimating of the IA change at 470 depicted in FIG. 4.

At 610, the UE 210 optionally transmits a request for position tracking services to the BS 220. The transmitting at 610 may be performed by, for example, the at least one transceiver 216 depicted in FIG. 2A. Accordingly, the at least one transceiver 216 may constitute means for transmitting a request for position tracking services to a BS.

As noted above with respect to FIG. 5, the BS 220 may be configured to provide position tracking services to the UE 210 in response to reception of the request transmitted at 610. The BS 220 may also be configured to transmit a request acknowledgement to the UE 210.

At 612, the UE 210 optionally receives a request acknowledgement from the BS 220. The request acknowledgement may indicate that the request for position tracking services transmitted at 610 has been received and/or granted. The receiving at 612 may be performed by, for example, the at least one transceiver 216 depicted in FIG. 2A. Accordingly, the at least one transceiver 216 may constitute means for receiving a request acknowledgement from a BS.

As noted above, the BS 220 may or may not be configured to transmit the request acknowledgement. Accordingly, in some implementations (those in which the BS 220 is not required to transmit the request acknowledgement), the UE 210 may proceed to 620 in response to a determination that the transmitting at 610 has been completed. In other implementations (those in which a request acknowledgement is expected), the UE 210 may wait until the request acknowledgement is received at 612 before proceeding to 620. In yet another implementation, the UE 210 may determine whether the request acknowledgement received at 612 indicates that the request has been granted, and proceed to 620 upon determining that the request has been granted.

At 620, the UE 210 receives at least one first downlink symbol. The receiving at 620 may be performed by, for example, the at least one transceiver 216 depicted in FIG. 2A. Accordingly, the at least one transceiver 216 may constitute means for receiving at least one first downlink symbol.

The at least one first downlink symbol may be transmitted by the base station 220 in accordance with a modified TDD schedule, as described above in relation to FIG. 5. To return to an earlier example, symbol periods 3-8 of a particular slot may be reserved for downlink and the at least one first downlink symbol may include symbols transmitted during those five symbol periods.

At 630, the UE 210 observes an uplink gap. The observing at 630 may be performed by, for example, the processing system 212, the memory system 214, and/or the at least one transceiver 216 depicted in FIG. 2A. Accordingly, the processing system 212, the memory system 214, and/or the at least one transceiver 216 may constitute means for observing an uplink gap.

For the duration of the uplink gap, the UE 210 may optionally transmit uplink symbols to the base station 220, but will not receive downlink symbols therefrom. To return to the earlier example, symbol periods 9-10 may be reserved for uplink and there may be no downlink symbols received during those two symbol periods.

At 640, the UE 210 receives at least one second downlink symbol. The receiving at 640 may be analogous to the receiving at 620 and may be performed by, for example, the at least one transceiver 216 depicted in FIG. 2A. Accordingly, the at least one transceiver 216 may constitute means for receiving at least one second downlink symbol.

The at least one second downlink symbol may be transmitted by the base station 220 in accordance with the modified TDD schedule, as described above in relation to FIG. 5. To return to the earlier example, symbol periods 11-13 of a particular slot may be reserved for downlink and the at least one second downlink symbol may include symbols transmitted during those three symbol periods.

At 650, the UE 210 determines that a duration of the uplink gap observed at 630 does not exceed an uplink gap threshold. The determining at 650 may be performed by, for example, the processing system 212 and/or memory system 214 depicted in FIG. 2A. Accordingly, the processing system 212 and/or memory system 214 may constitute means for determining that a duration of an uplink gap does not exceed an uplink gap threshold.

As noted above, the base station 220 may transmit downlink symbols and uplink symbols in accordance with the modified TDD schedule, wherein the modifications ensure that there are no uplink periods in excess of the uplink gap threshold. In the earlier example, the uplink gap threshold was set at 120 µs and the modified TDD schedule included no more than three consecutive uplink symbol periods. In some implementations, the UE 210 may measure the duration of the uplink gap (75 µs for uplink symbol periods 9-10), compare the measured duration to the uplink gap threshold (120 µs), and determine that the duration of the uplink gap does not exceed the uplink gap threshold. In other implementations, the UE 210 may assume that the uplink gap threshold has not been exceeded based on a determination that the request for position tracking service has been transmitted at 610, a determination that a request acknowledgement has been received at 620, and/or a determination that the request acknowledgement indicates that the request for position tracking service has been granted.

At 660, the UE 210 estimates that IA change is zero. The IA change estimated at 660 may be analogous to the IA change estimated at 470 in FIG. 4. The determination may be based on the determination at 650 that the duration of the uplink gap observed at 630 does not exceed the uplink gap threshold. The determining at 660 may be performed by, for example, the processing system 212 and/or memory system 214 depicted in FIG. 2A. Accordingly, the processing system 212 and/or memory system 214 may constitute means for determining that IA change is zero.

The uplink gap threshold may be set to a standardized predetermined value. Alternatively, the uplink gap threshold may be selected based on one or more characteristics of the carrier wave and/or TDD frame structure. As an example, consider a TDD frame structure with a downlink carrier wave frequency of 3 GHz configured such that µ=2 (wherein there are N=2 slots per subframe, each having a duration of ½ milliseconds, and a subcarrier frequency $f_{SC}$=30 KHz). The wavelength of a 3 GHz downlink carrier wave is approximately 10 cm. Accordingly, if the UE 210 is moving at a rate of 40 m/s, the UE 210 may move 2 cm during each ½-millisecond slot. Because 2 cm of movement is less than ½ of the wavelength of the 3 GHz carrier wave (10 cm, as noted above), it may be safely assumed that a previously-resolved integer ambiguity associated with the downlink carrier wave does not change and likewise the estimated position change can be zero during a ½-millisecond uplink gap. Accordingly, the value of the uplink gap threshold may be set to ½ milliseconds by default or selected to be ½ milliseconds based on the frequency of the carrier wave (3 GHz).

It will be understood that if it is determined at 650 that the uplink gap does not exceed the ½-millisecond uplink gap threshold, then the UE 210 may proceed to 660 and estimate that the position change is zero and/or the IA change is zero. By contrast, if it is determined at 650 that the uplink gap threshold is exceeded, then the UE 210 may proceed to re-resolve the IA in accordance with conventional methods (for example, by using the computationally intensive and time-consuming double differences technique).

In other implementations, the uplink gap threshold may be selectably set to a value based on a characteristic (for example, a frequency) of the downlink carrier wave. In the previous example, the TDD frame structure had a configuration µ=2, wherein the UE 210 was presumed to move 2 cm or less during ½ milliseconds, well below the wavelength of the carrier wave (10 cm). However, if the base station 220 is transmitting using a 28 GHz frequency (as in mmW configurations), 2 cm may be greater than the wavelength of the carrier wave (1.07 cm). Accordingly, at higher frequencies, the UE 210 may select a lower uplink gap threshold.

FIG. 7 generally illustrates another method 700 performed by the UE 210 depicted in FIG. 2A to perform the estimating of the IA change at 470 depicted in FIG. 4.

At 710, the UE 210 receives a Synchronization Signal Block (SSB). The SSB may comprise one or more of a Primary Synchronization Signal (PSS) and/or Secondary Synchronization Signal (SSS). The SSB is modulated on a downlink carrier wave and may be transmitted/received, for example, every twenty milliseconds. The receiving at 710 may be performed by, for example, the at least one transceiver 216 depicted in FIG. 2A. Accordingly, the at least one transceiver 216 may constitute means for receiving an SSB.

At 720, the UE 210 tracks changes in the position of the UE 210, a velocity of the UE 210 and/or changes in a direction of the UE 210. The tracking at 720 may be performed by, for example, the aiding sensor optionally included in the other components 218 depicted in FIG. 2A. Additionally or alternatively, the tracking at 720 may be performed by, for example, the processing system 212 and/or the memory system 214 depicted in FIG. 2A. Accordingly, the aiding sensor, the processing system 212 and/or the memory system 214 may constitute means for tracking changes in a velocity of a UE and changes in a direction of the UE.

At 730, the UE 210 determines a direction of the BS 220. The determining at 730 may be performed by, for example, the processing system 212 and/or the memory system 214 depicted in FIG. 2A. Accordingly, the processing system 212 and/or the memory system 214 may constitute means for determining a direction of the BS.

As noted above, the present method 700 is for estimating a change in IA when attempting to perform high-precision positioning based on carrier phase measurements. The UE 210 may estimate the direction of the BS 220 using, for example, code-phase measurements, which are less precise but easier to measure.

At 740, the UE 210 determines if the UE 210 is moving toward the base station 220 or away from the base station 220. The determining at 740 may be performed by, for example, the processing system 212 and/or the memory system 214 depicted in FIG. 2A, and may be based on, for example, the changes tracked at 720. Accordingly, the processing system 212 and/or the memory system 214 may constitute means for determining if a UE is moving toward a base station or away from the base station 220. If the UE 210 determines that the UE 210 is moving toward the base station 220 ('toward' at 740), the method 700 may proceed to 750. If the UE 210 determines that the UE 210 is moving away from the base station 220 ('away' at 740), the method 700 may proceed to 760.

At 750, the UE 210 decreases an estimate of IA change in proportion to the velocity of the UE 210 tracked at 720. The amount of decrease may also be proportional to the difference between the direction of the base station 220 and the direction of the UE 210 tracked at 720. For example, in a scenario where the UE 210 is moving directly toward the base station 220, the amount of decrease may be relatively larger than it would be in a scenario where the UE 210 is getting closer to the base station 220, but not moving directly toward it. The decreasing of the estimate at 750 may be performed by, for example, the processing system 212 and/or the memory system 214 depicted in FIG. 2A. Accordingly, the processing system 212 and/or the memory system 214 may constitute means for decreasing an estimate of IA change in proportion to the velocity of a UE.

At 760, the UE 210 increases an estimate of IA change in proportion to the velocity of the UE 210 tracked at 720. The amount of increase may also be proportional to the difference between the direction of the base station 220 and the direction of the UE 210 tracked at 720. For example, in a scenario where the UE 210 is moving directly away from the base station 220, the amount of increase may be relatively larger than it would be in a scenario where the UE 210 is getting further from the base station 220, but not moving directly away from it. The increasing of the estimate at 760 may be performed by, for example, the processing system 212 and/or the memory system 214 depicted in FIG. 2A. Accordingly, the processing system 212 and/or the memory system 214 may constitute means for increasing an estimate of IA change in proportion to the velocity of a UE.

The method 700 may begin, as noted above, with the receiving of the SSB at 710 and may be performed continually until a next SSB is received (i.e., for a little less than twenty milliseconds).

In view of the foregoing, it will be appreciated that various aspects disclosed herein may include various means for performing the functionalities, processes and/or steps described herein. It will be appreciated that the means for performing these aspects may be any of the elements, devices, components and/or structures disclosed herein and/or equivalents. Further, it will be appreciated that various design choices may allowed one skilled in the art to combine the functionalities into one element or distribute the functionalities between multiple elements. Further, the same element may be used for multiple means, either solely or in combination with other disclosed elements. For example, the processing system 222 and memory system 224, discussed in the foregoing, may be used with the transceiver(s) 226 for some functions and used alone or in combination with other elements for other functions.

Accordingly, the various aspects may include an apparatus including means for receiving one or more downlink signals transmitted from a base station (BS) during a downlink period. The downlink signals may be modulated using a downlink carrier wave. Means for measuring, during the downlink period, a first carrier phase associated with the downlink carrier wave. Means for estimating, during an uplink period subsequent to the downlink period, an integer ambiguity (IA) change. Additionally, the apparatus can include means for measuring, during a later downlink period subsequent to the uplink period, a second carrier phase based on the measured first carrier phase and the estimated IA change.

As discussed herein, an integrated circuit may include an application-specific integrated circuit (ASIC), a processor, software, other related components, or any combination thereof. Thus, the functions performed by these components as described herein may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module. One skilled in the art will recognize in this disclosure an algorithm represented in the description described above, as well in sequences of actions that may be represented by pseudocode.

In addition, the components and functions described herein may be implemented using any suitable means. Such means also may be implemented, at least in part, using corresponding structure as taught herein. For example, the components described above may correspond to similarly designated "code for" functionality. Thus, in some aspects one or more of such means may be implemented using one or more of processor components, integrated circuits, or other suitable structure as taught herein.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted (unless specified otherwise) as "based at least in part on" rather than, for example, "based solely on". It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc.

It should be further understood that any reference to an element herein using a designation such as "first." "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality, by programming the apparatus or component so that it will provide the functionality- or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A user equipment (UE), comprising:
   at least one transceiver configured to receive one or more downlink signals transmitted from a base station (BS) during a downlink period, wherein the one or more downlink signals are modulated using a downlink carrier wave;
   a memory system configured to store data, instructions, or a combination thereof; and
   a processing system coupled to the memory system and configured to:
      measure, during the downlink period, a first carrier phase associated with the downlink carrier wave;
      estimate, during an uplink period subsequent to the downlink period, an integer ambiguity (IA) change; and
      measure, during a later downlink period subsequent to the uplink period, a second carrier phase based on the measured first carrier phase and the estimated IA change.

2. The UE of claim 1, wherein the processing system is further configured to estimate, during the later downlink period, a change in relative position based on the estimated IA change.

3. The UE of claim 2, wherein the processing system is further configured to:
   generate a local mirror of the downlink carrier wave; and
   measure a delay from a time the local mirror is generated to a time the downlink carrier wave is received at the at least one transceiver, wherein the delay includes a full integer number of cycles associated with a second IA and the measured second carrier phase;
   determine a pseudorange from the BS to the UE based on the delay; and
   determine a position of the UE based on the determined pseudorange.

4. The UE of claim 3, wherein:
   the at least one transceiver is further configured to receive from the BS at least one first downlink symbol and at least one second downlink symbol, wherein there is an uplink gap in which no downlink symbol is received between the at least one first downlink symbol and the at least one second downlink symbol; and
   to estimate the IA change, the processing system is further configured to:
      determine whether the uplink gap exceeds or does not exceed an uplink gap threshold;
      determine that a position change is zero, based on a determination that the uplink gap does not exceed the uplink gap threshold; and
      set the second IA equal to a first IA in response to the determination that the position change is zero.

5. The UE of claim 4, wherein:
   the at least one transceiver is further configured to:
      transmit to the BS a request for position tracking service, wherein the request for position tracking service comprises a request to limit or reduce a duration of the uplink gap;
      receive from the BS a request acknowledgement; and
   to estimate the IA change, the processing system is further configured to:

set the second IA equal to the first IA in response to a determination that the request acknowledgement has been received from the BS.

6. The UE of claim 1, wherein the UE further comprises an aiding sensor, and wherein:
  the at least one transceiver is further configured to receive from the BS at least one signal synchronization block; and
  the processing system is further configured to:
    track relative movement of the UE during the uplink period based on signals received from the aiding sensor;
    estimate the IA change based on the relative movement; and
    set a second IA based on a first IA and the IA change.

7. The UE of claim 6, wherein the relative movement comprises changes in at least one of a position of the UE, a velocity of the UE or a direction of the UE; and
  the aiding sensor includes one or more of an inertial motion unit (IMU), a wheel sensor, and a camera.

8. The UE of claim 7, wherein:
  the processing system and/or the at least one transceiver is further configured to determine a direction of the BS relative to the UE; and
  to estimate the IA change, the processing system is further configured to:
    determine whether the tracked direction of the UE is away from the BS or toward the BS;
    increase the estimate of the IA change based on a determination that the tracked direction of the UE is away from the BS; and
    decrease the estimate of the IA change based on a determination that the tracked direction of the UE is toward the BS.

9. The UE of claim 8, wherein an amount of increase or decrease of the estimate is based on one or more of:
  changes in position of the UE; and
  a difference between the tracked direction of the UE and the determined direction of the BS relative to the UE.

10. A method, comprising:
  receiving one or more downlink signals transmitted from a base station (BS) during a downlink period, wherein the one or more downlink signals are modulated using a downlink carrier wave;
  measuring, during the downlink period, a first carrier phase associated with the downlink carrier wave;
  estimating, during an uplink period subsequent to the downlink period, an integer ambiguity (IA) change; and
  measuring, during a later downlink period subsequent to the uplink period, a second carrier phase based on the measured first carrier phase and the estimated IA change.

11. The method of claim 10, further comprising:
  estimating, during the later downlink period, a change in a relative position of a user equipment (UE) based on the estimated IA change.

12. The method of claim 10, further comprising:
  resolving, during the downlink period, a first IA associated with the downlink carrier wave; and
  calculating, during the later downlink period, a second IA based on the resolved first IA and the estimated IA change.

13. The method of claim 12, further comprising:
  generating a local mirror of the downlink carrier wave;
  measuring a delay from a time the local mirror is generated to a time the downlink carrier wave is received, wherein the delay includes a full integer number of cycles associated with the calculated second IA and the measured second carrier phase;
  determining a pseudorange from the BS to a user equipment (UE) based on the delay; and
  determining a position of the UE based on the determined pseudorange.

14. The method of claim 10, further comprising:
  receiving from the BS at least one first downlink symbol and at least one second downlink symbol, wherein there is an uplink gap in which no downlink symbol is received between the at least one first downlink symbol and the at least one second downlink symbol;
  wherein the estimating of the IA change comprises:
    determining whether the uplink gap exceeds or does not exceed an uplink gap threshold;
    determining that a position change is zero, based on a determination that the uplink gap does not exceed the uplink gap threshold; and
    setting a second IA equal to a first IA in response to the determination that the position change is zero.

15. The method of claim 14, further comprising:
  transmitting to the BS a request for position tracking service, wherein the request for position tracking service comprises a request to limit or reduce a duration of the uplink gap; and
  receiving from the BS a request acknowledgement;
  wherein the estimating of the IA change further comprises setting the second IA equal to the first IA in response to a determination that the request acknowledgement has been received from the BS.

16. The method of claim 10, further comprising:
  receiving from the BS at least one signal synchronization block
  tracking relative movement during the uplink period based on signals received from an aiding sensor;
  estimating the IA change based on the relative movement; and
  setting a second IA based on a first IA and the IA change.

17. The method of claim 16, wherein the relative movement comprises changes in at least one of the position, a velocity or a direction and is tracked using the aiding sensor.

18. The method of claim 17, further comprising determining a relative direction of the BS; wherein the estimating of the IA change further comprises:
  determining whether the tracked direction is away from the BS or toward the BS;
  increasing the estimate of the IA change based on a determination that the tracked direction is away from the BS; and
  decreasing the estimate of the IA change based on a determination that the tracked direction is toward the BS.

19. The method of claim 18, wherein an amount of increase or decrease of the estimate is based on one or more of:
  changes in position; and
  a difference between the tracked direction and the determined relative direction of the BS.

20. An apparatus, comprising:
  means for receiving one or more downlink signals transmitted from a base station (BS) during a downlink period, wherein the one or more downlink signals are modulated using a downlink carrier wave;
  means for measuring, during the downlink period, a first carrier phase associated with the downlink carrier wave;

means for estimating, during an uplink period subsequent to the downlink period, an integer ambiguity (IA) change; and means for measuring, during a later downlink period subsequent to the uplink period, a second carrier phase based on the measured first carrier phase and the estimated IA change.

21. The apparatus of claim 20, further comprising:
means for estimating, during the later downlink period, a change in a relative position of the apparatus based on the estimated IA change.

22. The apparatus of claim 20, further comprising:
means for resolving, during the downlink period, a first IA associated with the downlink carrier wave; and
means for calculating, during the later downlink period, a second IA based on the resolved first IA and the estimated IA change.

23. The apparatus of claim 20, further comprising:
means for receiving from the BS at least one first downlink symbol and at least one second downlink symbol, wherein there is an uplink gap in which no downlink symbol is received between the at least one first downlink symbol and the at least one second downlink symbol;
wherein the means for estimating the IA change comprises:
  means for determining whether the uplink gap exceeds or does not exceed an uplink gap threshold;
  means for determining that a position change is zero, based on a determination that the uplink gap does not exceed the uplink gap threshold; and
  means for setting a second IA equal to a first IA in response to the determination that the position change is zero.

24. The apparatus of claim 20, wherein the apparatus further comprises:
means for receiving from the BS at least one signal synchronization block;
means for tracking relative movement during the uplink period;
means for estimating the IA change based on the relative movement; and
means for setting a second IA based on a first IA and the IA change.

25. A non-transitory computer-readable medium comprising at least one instruction for causing a processor to perform operations, comprising:
code for receiving one or more downlink signals transmitted from a base station (BS) during a downlink period, wherein the one or more downlink signals are modulated using a downlink carrier wave;
code for measuring, during the downlink period, a first carrier phase associated with the downlink carrier wave;
code for estimating, during an uplink period subsequent to the downlink period, an integer ambiguity (IA) change; and
code for measuring, during a later downlink period subsequent to the uplink period, a second carrier phase based on the measured first carrier phase and the estimated IA change.

26. The non-transitory computer-readable medium of claim 25, further comprising:
code for estimating, during the later downlink period, a change in a relative position of a user equipment (UE) that includes the processor based on the estimated IA change.

27. The non-transitory computer-readable medium of claim 25, further comprising:
code for resolving, during the downlink period, a first IA associated with the downlink carrier wave; and
code for calculating, during the later downlink period, a second IA based on the resolved first IA and the estimated IA change.

28. The non-transitory computer-readable medium of claim 25, further comprising:
code for receiving from the BS at least one first downlink symbol and at least one second downlink symbol, wherein there is an uplink gap in which no downlink symbol is received between the at least one first downlink symbol and the at least one second downlink symbol;
wherein the code for estimating the IA change comprises:
  code for determining whether the uplink gap exceeds or does not exceed an uplink gap threshold;
  code for determining that a position change is zero, based on a determination that the uplink gap does not exceed the uplink gap threshold; and
  code for setting a second IA equal to a first IA in response to the determination that the position change is zero.

29. The non-transitory computer-readable medium of claim 25, further comprising:
code for receiving from the BS at least one signal synchronization block;
code for tracking relative movement during the uplink period based on signals received from an aiding sensor;
code for estimating the IA change based on the relative movement; and
code for setting a second IA based on a first IA and the IA change.

30. The non-transitory computer-readable medium of claim 29, wherein the relative movement comprises changes in at least one of the position, a velocity or a direction and is tracked using the aiding sensor.

* * * * *